(12) United States Patent
Gruner et al.

(10) Patent No.: US 11,111,003 B2
(45) Date of Patent: Sep. 7, 2021

(54) AEROSEAL AND METHOD OF FORMING THE SAME

(71) Applicant: The Boeing Company, Chicago, IL (US)

(72) Inventors: Bryan J. Gruner, Bellevue, WA (US); Bruce A. Dahl, Kent, WA (US)

(73) Assignee: The Boeing Company, Chicago, IL (US)

( * ) Notice: Subject to any disclaimer, the term of this patent is extended or adjusted under 35 U.S.C. 154(b) by 277 days.

(21) Appl. No.: 16/414,938

(22) Filed: May 17, 2019

(65) Prior Publication Data
US 2020/0361591 A1    Nov. 19, 2020

(51) Int. Cl.
| | | |
|---|---|---|
| *B64C 1/00* | (2006.01) | |
| *B64C 3/36* | (2006.01) | |
| *B64C 7/00* | (2006.01) | |
| *B64C 9/02* | (2006.01) | |
| *F16J 15/02* | (2006.01) | |
| *B64C 23/00* | (2006.01) | |

(52) U.S. Cl.
CPC .............. *B64C 1/0009* (2013.01); *B64C 3/36* (2013.01); *B64C 7/00* (2013.01); *B64C 9/02* (2013.01); *F16J 15/027* (2013.01); *B64C 23/005* (2013.01)

(58) Field of Classification Search
CPC ....... B64C 1/0009; B64C 3/36; B64C 23/005; B64C 7/00; B64C 9/02; B64C 1/1492; B60R 13/06; F16J 15/00; F16J 15/02; F16J 15/022; F16J 15/027
See application file for complete search history.

(56) References Cited

U.S. PATENT DOCUMENTS

| | | | |
|---|---|---|---|
| 1,457,507 A * | 6/1923 | Delage | B64C 9/02 244/87 |
| 4,042,191 A | 8/1977 | Johnson | |
| 4,576,347 A | 3/1986 | Opsahl | |
| 5,213,287 A | 5/1993 | Barron | |
| 5,518,210 A | 5/1996 | Friberg | |
| 6,846,034 B1 * | 1/2005 | Angus | B60J 10/246 296/146.9 |
| 7,611,099 B2 | 11/2009 | Kordel et al. | |
| 8,657,236 B2 | 2/2014 | Trich s, Jr. et al. | |

(Continued)

FOREIGN PATENT DOCUMENTS

FR    1505136 A * 12/1967    ............. B60J 10/20

*Primary Examiner* — Richard R. Green
*Assistant Examiner* — William L Gmoser
(74) *Attorney, Agent, or Firm* — Walters & Wasylyna LLC (57) ABSTRACT

An aeroseal comprises a substantially straight portion having a first engagement end and a second engagement end opposite the first engagement end. The aeroseal also comprises a first engagement extension extending transversely from the first engagement end of the substantially straight portion and having a distal end. The aeroseal further comprises a second engagement extension extending transversely from the second engagement end of the substantially straight portion and having a distal end. The aeroseal also comprises a substantially curved portion interconnecting the distal end of the first engagement extension and the distal end of the second engagement extension to form an acute angle between the first and second engagement extensions and facing away from the substantially straight portion.

20 Claims, 12 Drawing Sheets

(56) References Cited

U.S. PATENT DOCUMENTS

| | | |
|---|---|---|
| 9,452,819 B2 | 9/2016 | Zeon et al. |
| 9,618,118 B2 | 4/2017 | Foster et al. |
| 2006/0108747 A1* | 5/2006 | Kesseg ............... F16J 15/025 |
| | | 277/644 |
| 2008/0148646 A1* | 6/2008 | Nozaki ................. B60J 10/32 |
| | | 49/490.1 |
| 2013/0175823 A1* | 7/2013 | Priess ................... B60J 10/24 |
| | | 296/146.9 |
| 2016/0186866 A1* | 6/2016 | Foster .................. B64D 47/00 |
| | | 277/640 |
| 2018/0170521 A1* | 6/2018 | Murayama ........... B64C 23/06 |
| 2020/0009954 A1* | 1/2020 | Hirtenlehner ......... B60J 10/27 |
| 2020/0317036 A1* | 10/2020 | Roux .................. B60J 10/246 |

* cited by examiner

AEROSEAL AND METHOD OF FORMING THE SAME

FIELD

The present application relates to seals and, more particularly, to aeroseals, such as aeroseals for use between control surfaces (e.g., inboard and outboard flaps) of an aircraft.

BACKGROUND

A known aeroseal includes a fixed bulb seal that is compressed between an inboard flap of an aircraft and an outboard flap of the aircraft. The typical fixed bulb seal must operate within a functional band from nominal compression, and is usually designed to operate at approximately 30 percent compression (i.e., relative to the cross-sectional diameter of the bulb). However, when there are large displacements between the inboard and outboard flaps, the bulb seal may become over compressed, or not compressed enough to provide an effective aerodynamic seal. Accordingly, those skilled in the art continue with research and development efforts in the field of aeroseals.

SUMMARY

In one aspect, an aeroseal comprises a substantially straight portion having a first engagement end and a second engagement end opposite the first engagement end. The aeroseal also comprises a first engagement extension extending transversely from the first engagement end of the substantially straight portion and having a distal end. The aeroseal further comprises a second engagement extension extending transversely from the second engagement end of the substantially straight portion and having a distal end. The aeroseal also comprises a substantially curved portion interconnecting the distal end of the first engagement extension and the distal end of the second engagement extension to form an acute angle between the first and second engagement extensions and facing away from the substantially straight portion.

In another aspect, a seal assembly comprises a first member and a second member spaced apart from the first member. The seal assembly also comprises an aeroseal positioned between the first and second members. The aeroseal comprises a first C-shaped portion including first and second distal ends defining a first partially enclosed volume within the first C-shaped portion. The aeroseal further comprises a second C-shaped portion including third and fourth distal ends defining a second partially enclosed volume within the second C-shaped portion. The second C-shaped portion is disposed in the first partially enclosed volume of the first C-shaped portion.

In another aspect, a method is provided for forming an aeroseal. The method comprises positioning a smaller C-shaped portion in a partially enclosed volume of a larger C-shaped portion. The method also comprises attaching a distal end of the smaller C-shaped portion to a distal end of the larger C-shaped portion. The method further comprises attaching an opposite distal end of the smaller C-shaped portion to an opposite distal end of the larger C-shaped portion.

Other aspects will become apparent from the following detailed description, the accompanying drawings and the appended claims.

DETAILED DESCRIPTION

The present application is directed to an aeroseal and method of forming the same. The specific aeroseal, forming method, and the industry in which the aeroseal and forming method are implemented may vary. It is to be understood that the disclosure below provides a number of embodiments or examples for implementing different features of various embodiments. Specific examples of components and arrangements are described to simplify the present disclosure. These are merely examples and are not intended to be limiting.

By way of example, the disclosure below describes aeroseals and forming methods for aircraft. More specifically, the disclosure below describes an aeroseal for use in an aircraft. The aeroseal and method of forming the aeroseal may be implemented by an original equipment manufacturer (OEM) for manufacturing aeroseals in compliance with any combination of commercial, military, and space regulations, for example.

Figure 1:
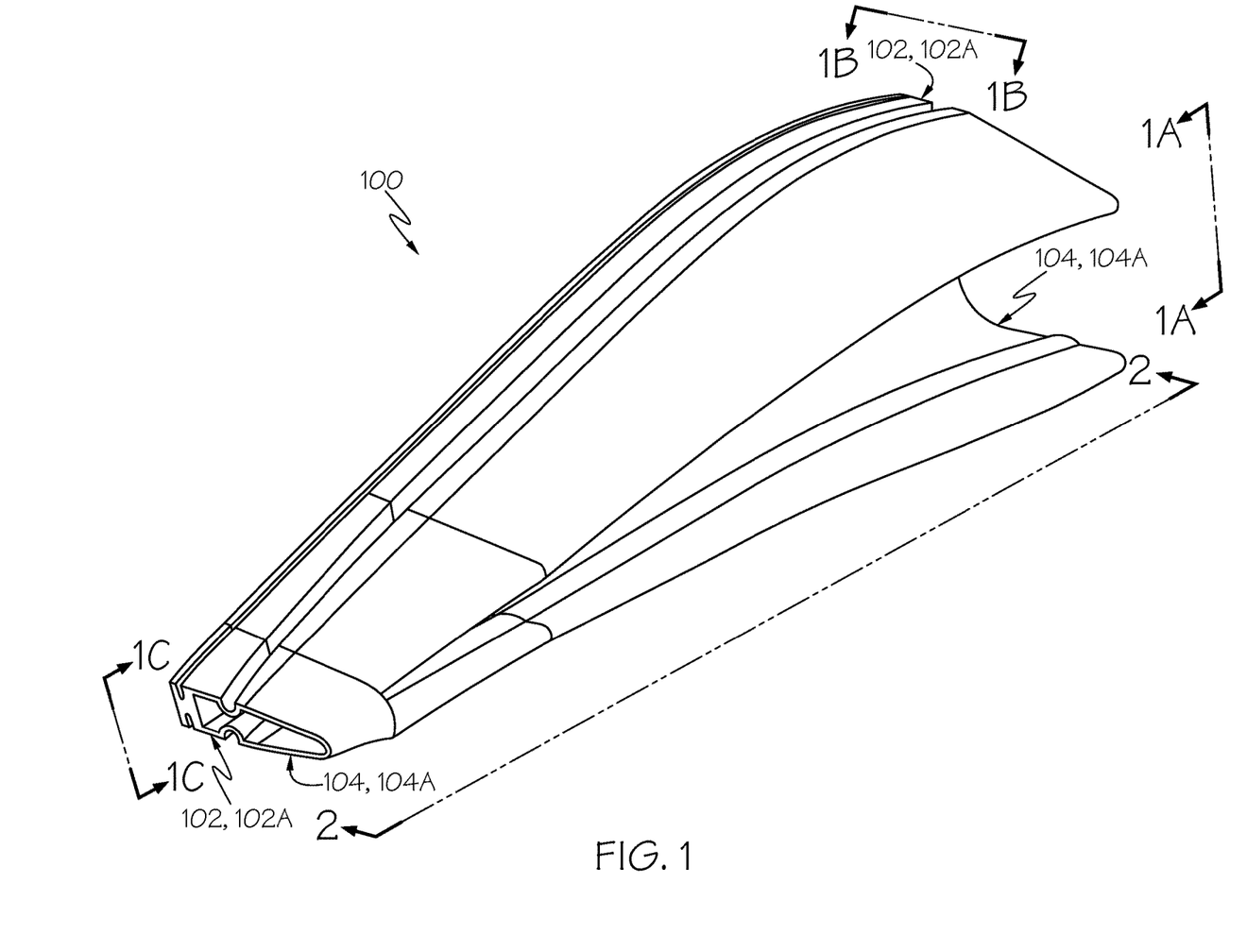
FIG. 1 is a perspective view of an example aeroseal constructed in accordance with an embodiment.
Figure 1A:
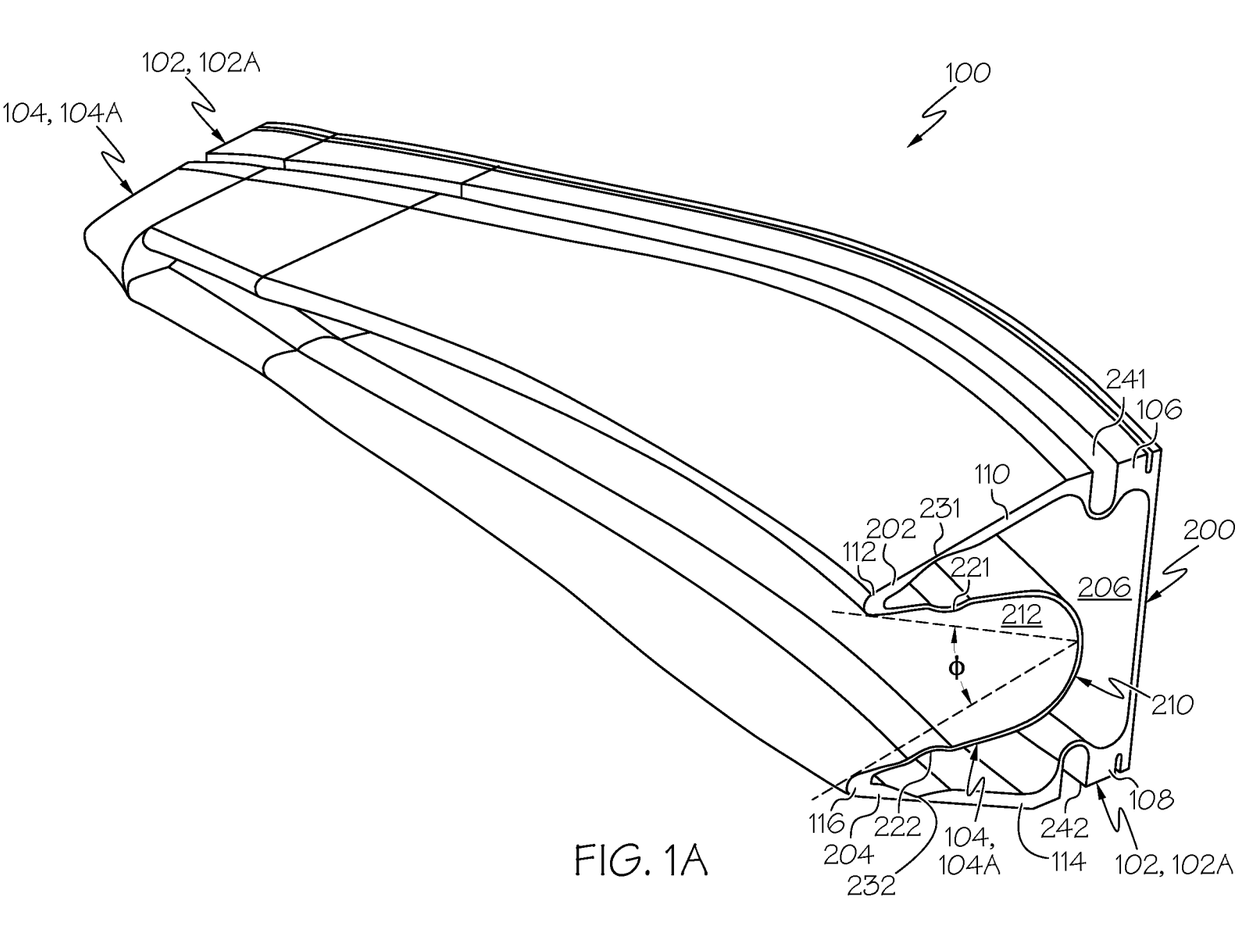
FIG. 1A is a perspective view, looking approximately along line "1A-1A" of FIG. 1.
Figure 1B:
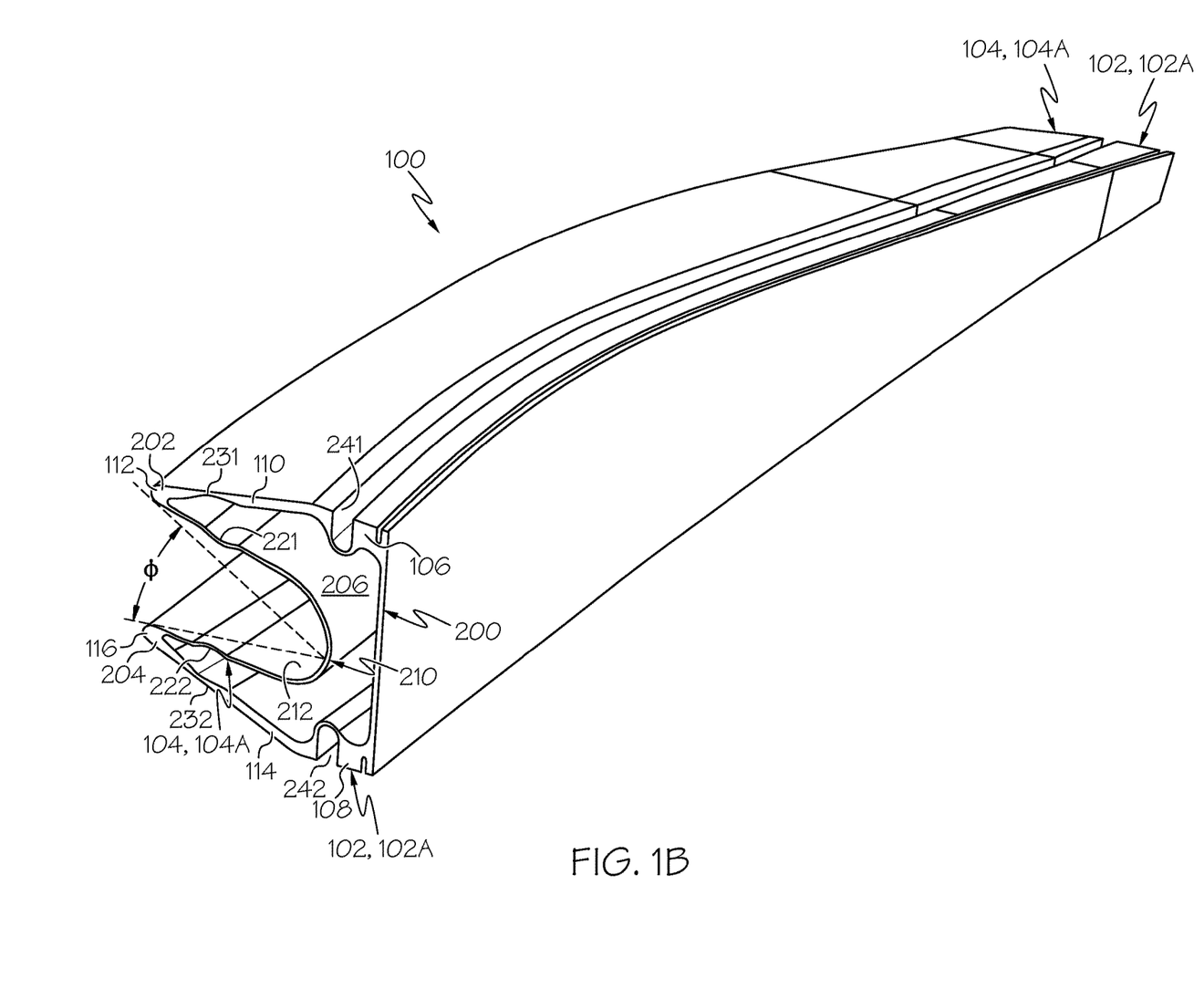
FIG. 1B is a perspective view, looking approximately along line "1B-1B" of FIG. 1.
Figure 1C:
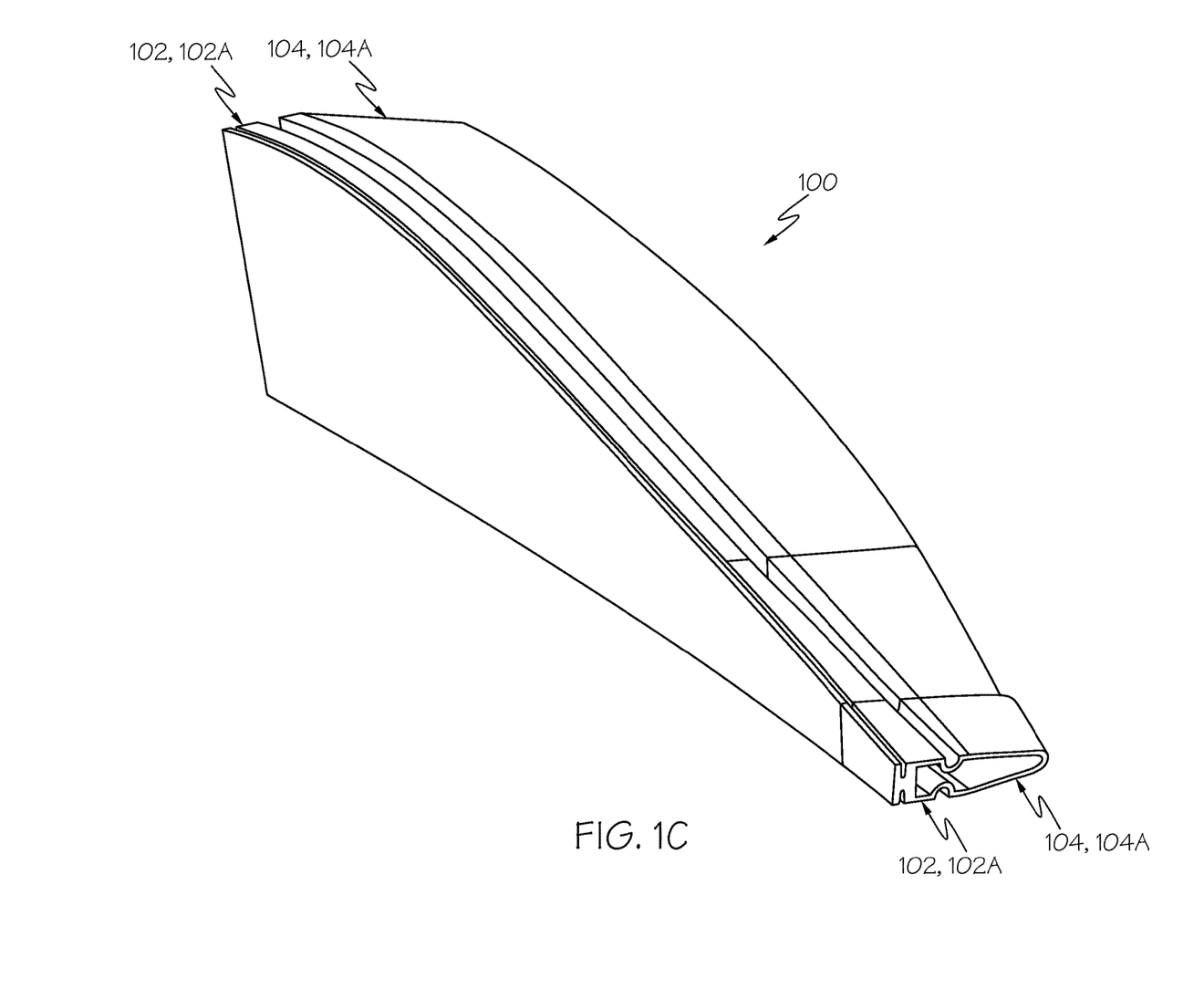
FIG. 1C is a perspective view, looking approximately along line "1C-1C" of FIG. 1.

Referring to FIG. 1, a perspective view of an example aeroseal 100 constructed in accordance with an embodiment is illustrated. FIG. 1A is a perspective view, looking approximately along line "1A-1A" of FIG. 1. FIG. 1B is a perspective view, looking approximately along line "1B-1B" of FIG. 1. FIG. 1C is a perspective view, looking approximately along line "1C-1C" of FIG. 1.

As best shown in FIGS. 1A and 1B, the aeroseal 100 comprises a substantially straight portion 102 and a substantially curved portion 104. The straight portion 102 has a first engagement end 106 and a second engagement end 108 opposite the first engagement end 106. A first engagement extension 110 extends transversely from the first engagement end 106 of the substantially straight portion 102. The first engagement extension 110 has a distal end 112. Similarly, a second engagement extension 114 extends transversely from the second engagement end 108 of the substantially straight portion 102. The second engagement extension 114 has a distal end 116.

The substantially curved portion 104 interconnects the distal end 112 of the first engagement extension 110 and the distal end 116 of the second engagement extension 114 to form an acute angle cp. The acute angle φ is located between the first and second engagement extensions 110, 114 and faces away from the substantially straight portion 102. In some embodiments, the acute angle φ between the first and second engagement extensions 110, 114 is between about five degrees and about 45 degrees.

The substantially straight portion 102 comprises a generally I-shaped portion 102A, and the substantially curved portion 104 comprises a generally C-shaped portion 104A. The I-shaped portion 102A, the first engagement extension 110, the second engagement extension 114, and the C-shaped portion 104A may be formed as a monolithic body. Compositionally, the monolithic body may comprise suitable sealing material, such as a silicon rubber covered with Dacron (trademark of Dupont).

While the above description describes the aeroseal 100 as having an I-shaped portion 102A and a C-shaped portion 104A, it is conceivable that the aeroseal can instead be described as having two C-shaped portions. In this regard, the two C-shaped portions would be described as follows with reference to FIGS. 1, 1A, 1B, 1C, 2, 2A, 2B, 2C, and 2D.

Figure 2:
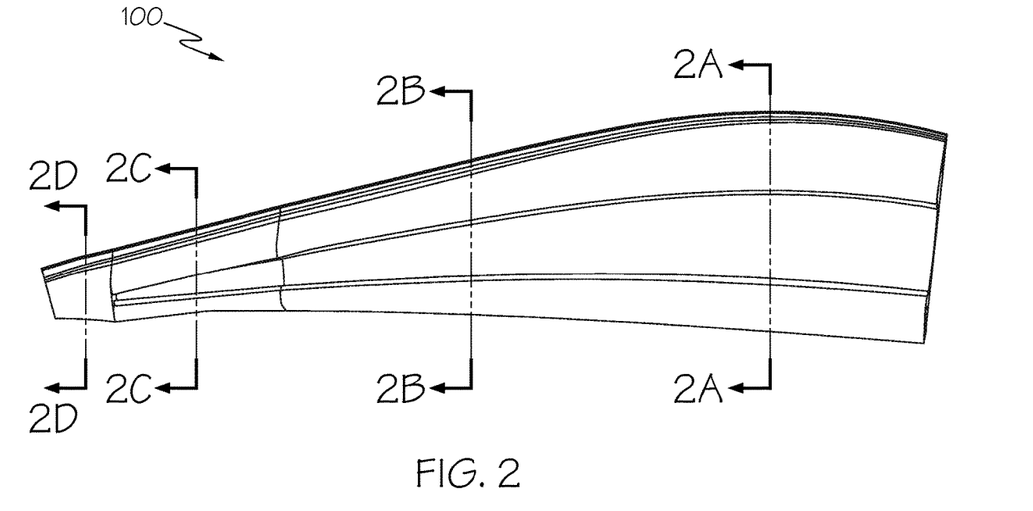
FIG. 2 is an elevational perspective view, looking approximately along line "2-2" of FIG. 1.
Figure 2A:
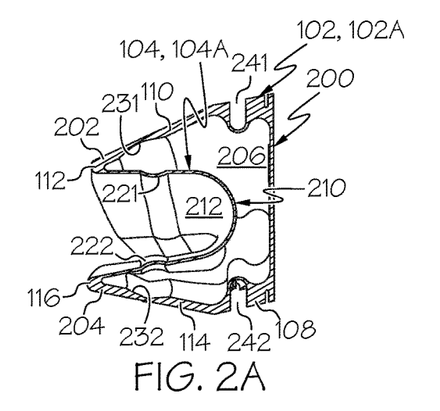
FIG. 2A is a sectional view, taken approximately along line "2A-2A" of FIG. 2.
Figure 2B:
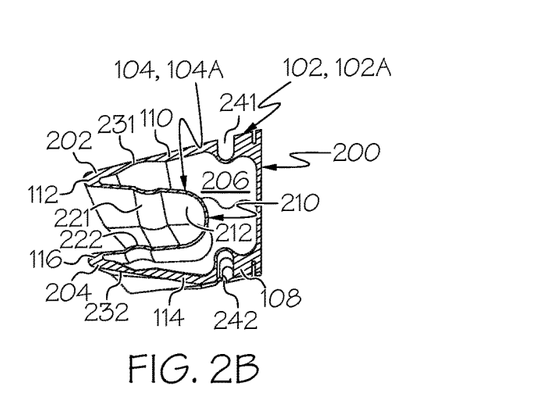
FIG. 2B is a sectional view, taken approximately along line "2B-2B" of FIG. 2.
Figure 2C:
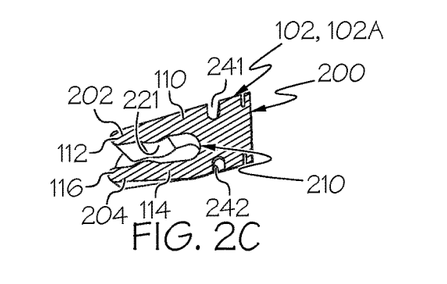
FIG. 2C is a sectional view, taken approximately along line "2C-2C" of FIG. 2.
Figure 2D:
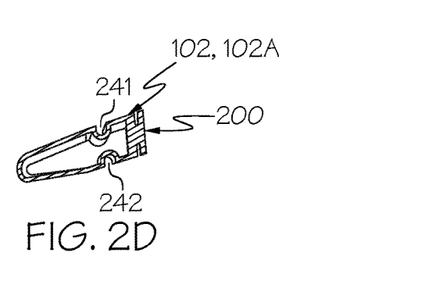
FIG. 2D is a sectional view, taken approximately along line "2D-2D" of FIG. 2.

Referring to FIG. 2, an elevational perspective view, looking approximately along line "2-2" of FIG. 1, is illustrated. FIG. 2A is a sectional view, taken approximately along line "2A-2A" of FIG. 2. FIG. 2B is a sectional view, taken approximately along line "2B-2B" of FIG. 2. FIG. 2C is a sectional view, taken approximately along line "2C-2C" of FIG. 2. FIG. 2D is a sectional view, taken approximately along line "2D-2D" of FIG. 2. It should be noted that the aeroseal 100 has a tapered profile. As such, some features that are visible in FIGS. 2A and 2B are not visible in FIGS. 2C and 2D.

The aeroseal 100 comprises a first C-shaped portion 200 including a first distal end 202 and a second distal end 204. The first and second distal ends 202, 204 define a first partially enclosed volume 206 within the first C-shaped portion 200. The aeroseal 100 also comprises a second C-shaped portion 210 including a third distal end corresponding to reference numeral 112 and a fourth distal end corresponding to reference numeral 116. The third and fourth distal ends 112, 116 define a second partially enclosed volume 212 within the second C-shaped portion 210. The second C-shaped portion 200 is disposed in the first partially enclosed volume 206 of the first C-shaped portion 200.

The first distal end 202 of the first C-shaped portion 200 and the third distal end 112 of the second C-shaped portion 210 are attached to each other. The second distal end 204 of the first C-shaped portion 200 and the fourth distal end 116 of the second C-shaped portion 210 are attached to each other. The first and second C-shaped portions 200, 210 may comprise a monolithic body. Compositionally, the monolithic body may comprise suitable sealing material, such as a silicon rubber covered with Dacron (trademark of DuPont). The specific material of the aeroseal 100 can be selected and tailored depending upon the particular application of the aeroseal 100.

The second C-shaped portion 210 includes at least one interior bead protruding toward the second partially enclosed volume 212. The at least one interior bead includes a first interior bead 221 positioned in vicinity of the third distal end 112 of the second C-shaped portion 210, and a second interior bead 222 positioned in vicinity of the fourth distal end 116 of the second C-shaped portion 210. The first interior bead 221 faces one direction, and the second interior bead 222 faces the opposite direction.

The first C-shaped portion 200 includes at least one exterior bead protruding away from the first partially enclosed volume 206. The at least one exterior bead includes a first exterior bead 231 positioned in vicinity of the first distal end 202 of the first C-shaped portion 200, and a second exterior bead 232 positioned in vicinity of the second distal end 204 of the first C-shaped portion 200. The first exterior bead 231 faces the first interior bead 221, and the second exterior bead 232 faces the second interior bead 222.

The first C-shaped portion also includes at least one exterior slot facing away from the first partially enclosed volume 206. The at least one exterior slot includes a first exterior slot 241 distal to the first exterior bead 231 of the first C-shaped portion 200, and a second exterior slot 242 positioned distal to the second exterior bead 232 of the first C-shaped portion 200. The first exterior slot 241 faces one direction, and the second exterior slot 242 faces the opposite direction. In some embodiments, the first slot 241 has a radius between about 0.20 inch (0.5 cm) and about 0.40 inch (1.0 cm), and the second slot 242 has a radius between about 0.20 inch (0.5 cm) and about 0.40 inch (1.0 cm).

While the above description describes the aeroseal 100 having two interior beads 221, 222, it is conceivable that any number of interior beads may be used. Similarly, while the aeroseal 100 is shown and described having two exterior beads 231, 232, it is conceivable that any number of exterior beads may be used. Also, those skilled in the art will appreciate that the overall size and shape of the aeroseal 100 may depend on the end application. The disclosed aeroseal 100 may be sized, shaped, and contoured accordingly.

Figure 3:
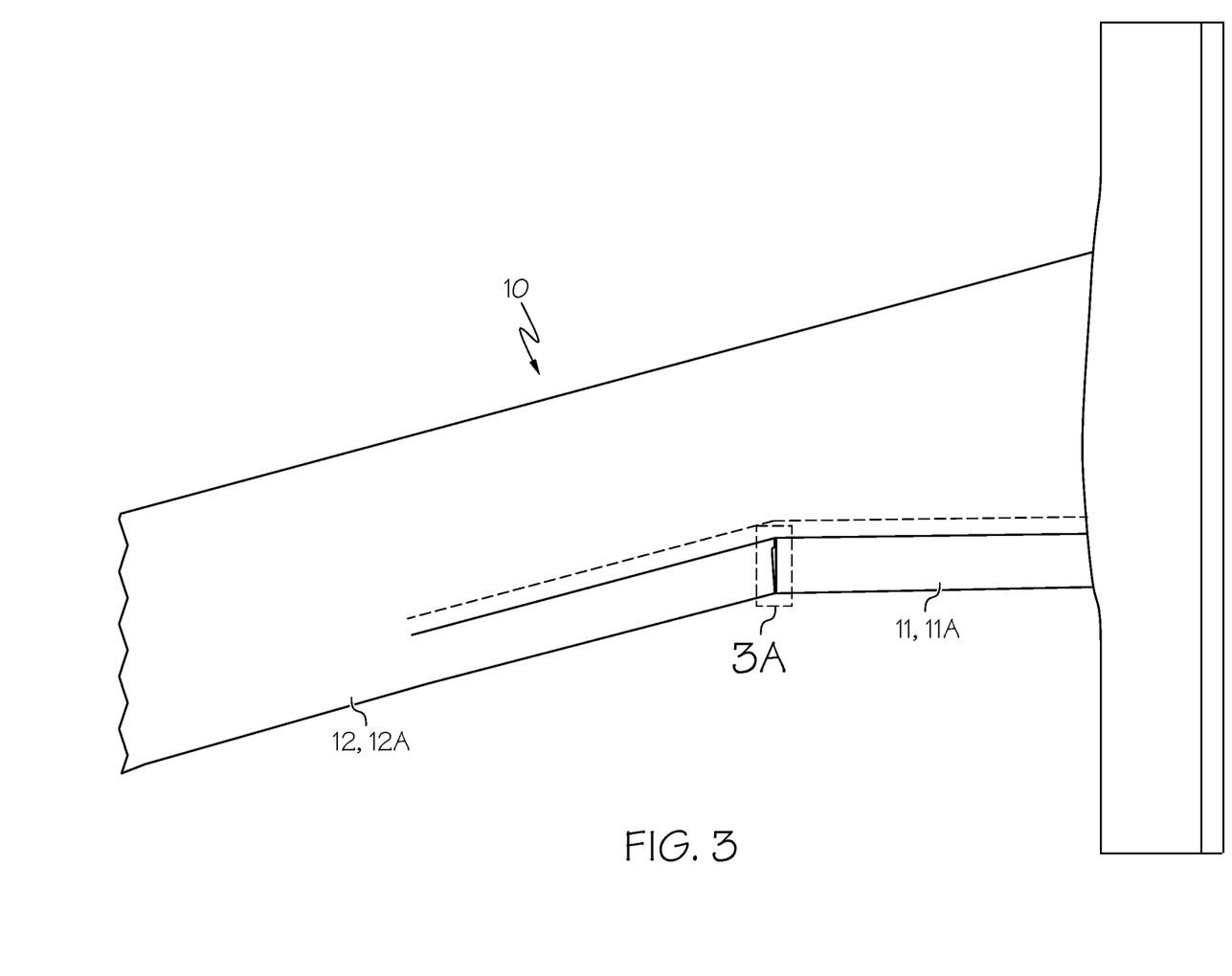
FIG. 3 is a top view of an aircraft wing embodying the aeroseal of FIG. 1.
Figure 3A:
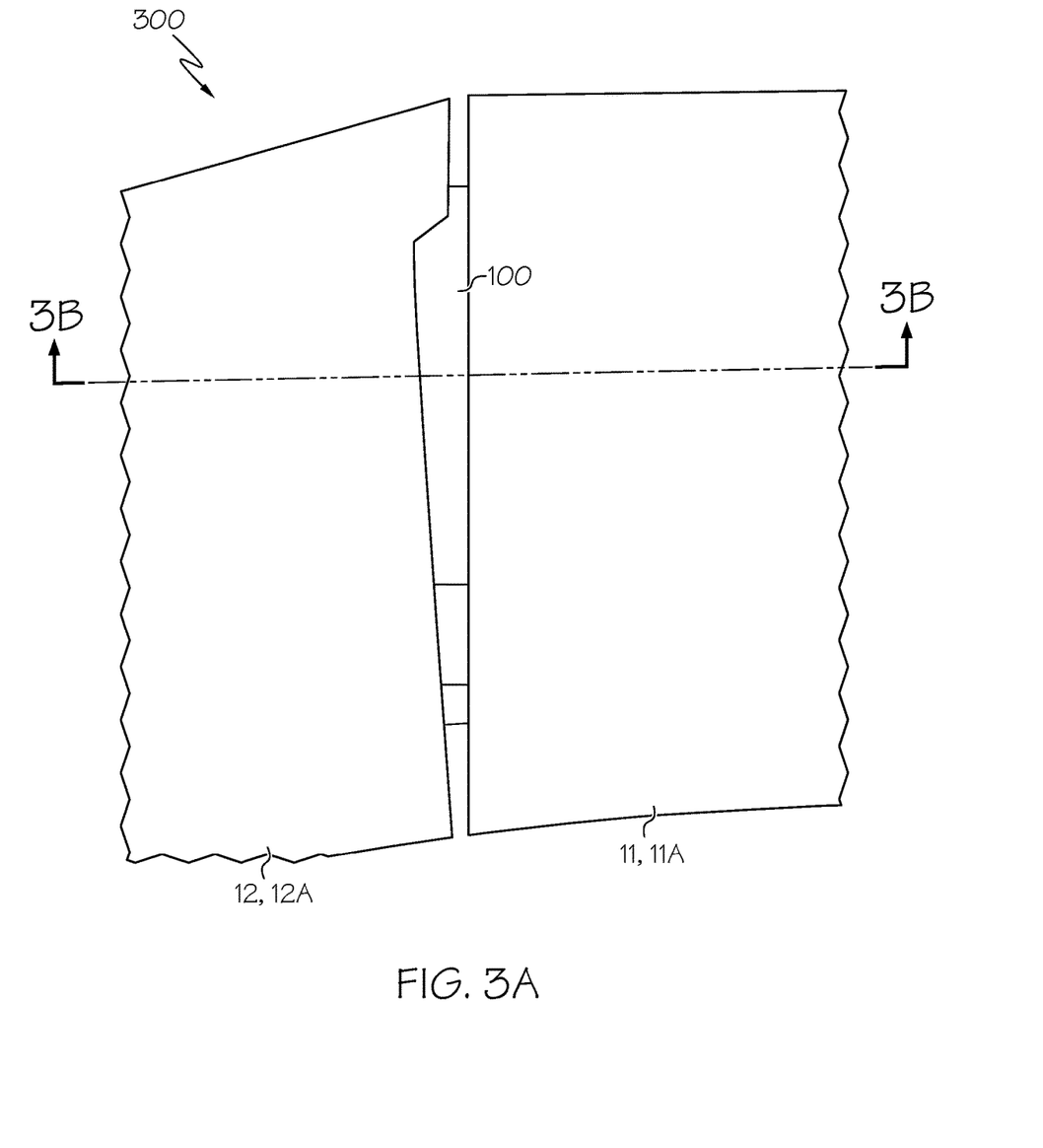
FIG. 3A is an enlarged view of a portion of FIG. 3, taken approximately in the area labeled as rectangle "3A" shown in FIG. 3.

Referring to FIG. 3, a top view of an aircraft wing 10 embodying the aeroseal 100 of FIG. 1 is illustrated. The aircraft wing 10 comprises a first member 11 in the form of an inboard flap 11A of the aircraft, and a second member 12 in the form of an outboard flap 12A of the aircraft. FIG. 3A is an enlarged view of a portion of FIG. 3, taken approximately in the area labeled as rectangle "3A" shown in FIG. 3. More specifically, FIG. 3A shows a seal assembly 300 comprising the aeroseal 100 in a deployed position between the inboard flap 11A and the outboard flap 12A. The aeroseal 100 provides an effective aerodynamic sealing function as relative motion occurs between the two flaps 11A, 12A, as will be described herein with particular reference to FIGS. 3B and 3C.

Figure 3B:
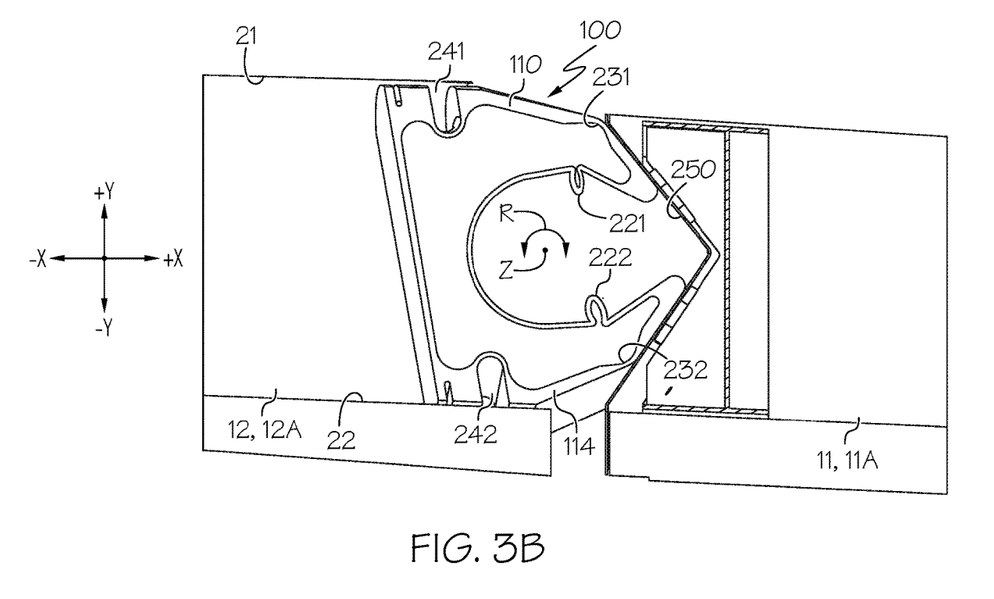
FIG. 3B is a sectional view, taken approximately along line "3B-3B" of FIG. 3A.
Figure 3C:
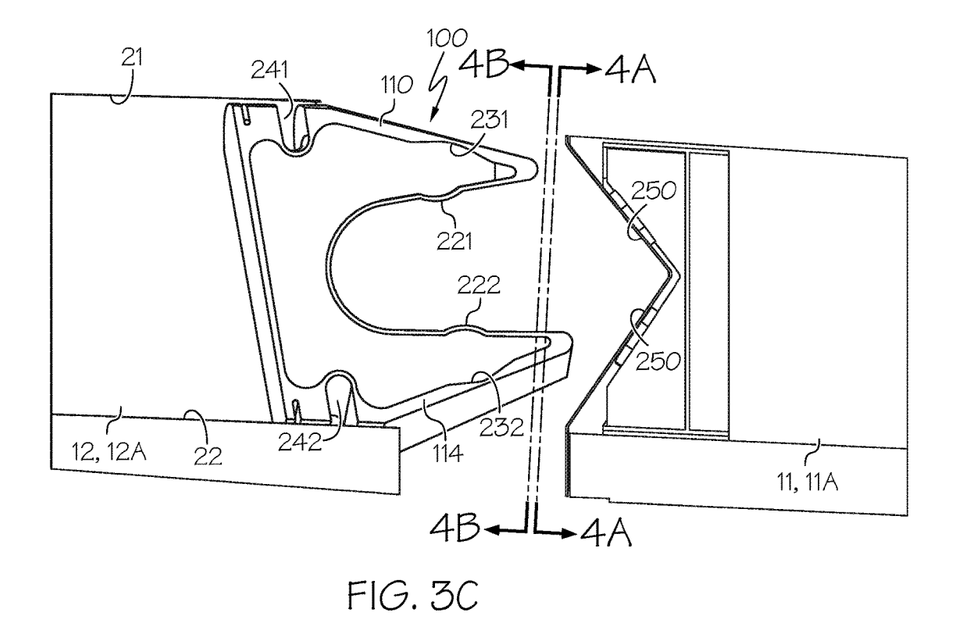
FIG. 3C is a sectional view similar to FIG. 3B with an aircraft wing flap moved away from the aeroseal.

FIG. 3B is a sectional view, taken approximately along line "3B-3B" of FIG. 3A, and shows parts of the aeroseal 100 in the deployed position. FIG. 3C is a sectional view similar to FIG. 3B with the inboard flap 11A moved away from the aeroseal 100, and shows parts of the aeroseal 100 in a relaxed position.

When the aeroseal 100 is in the relaxed position of FIG. 3C, the first and second engagement extensions 110, 114 are not compressed, and the first and second interior beads 221, 222 are relaxed. Also, the first and second exterior beads 231, 232 are relaxed.

When the aeroseal 100 is in the deployed position of FIG. 3B, the first and second engagement extensions 110, 114 are compressed, and the first and second interior beads 221, 222 are compressed and curled as shown. Also, the first and second exterior beads 232, 232 are compressed and curled as shown.

Figure 4A:
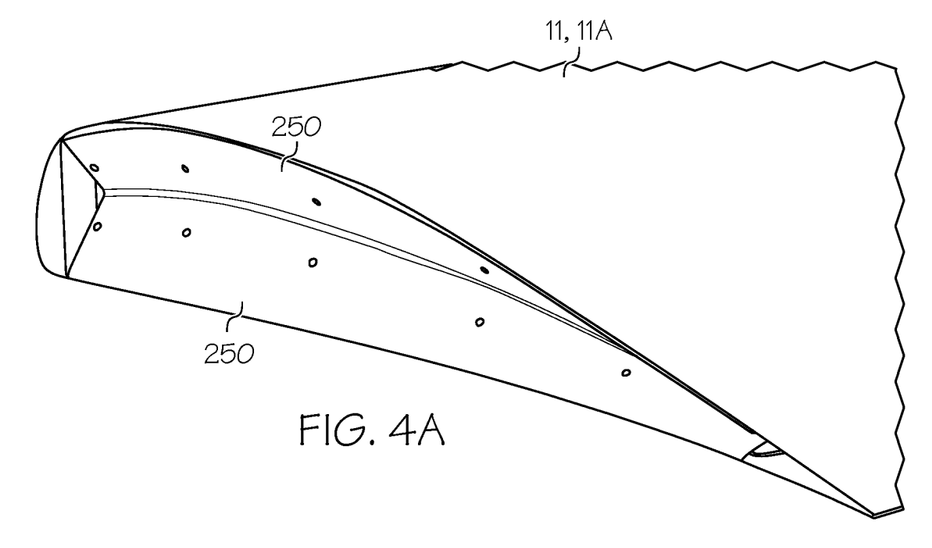
FIG. 4A is a perspective view, looking approximately along line 4A-4A of FIG. 3C.

Referring to FIG. 4A, a perspective view, looking approximately along line 4A-4A of FIG. 3C is illustrated. More specifically, FIG. 4A shows certain details of the inboard flap 11A, and in particular a mating cove 250 to which the aeroseal 100 is fixedly attached when the aeroseal 100 is in the deployed position of FIG. 3B. The aeroseal 100 may be mechanically fastened to the mating cove 250 using any suitable fastening method. For example, the aeroseal 100 may be bonded to the mating cove 250 using an adhesive. As another example, the aeroseal 100 may be secured to the mating cove 250 using fastening screws. Yet as another example, the aeroseal 100 may be retained using physically interlocking features, such as a C-channel metallic retainer attached to the inboard flap 11A mating with corresponding grooves on the aeroseal 100. Although the mating cove 250 is shown attached to the inboard flap 11A, it is conceivable that the mating cove 250 be attached to the outboard flap 12A. In this case, the aeroseal 100 would be turned around the other way.

Figure 4B:
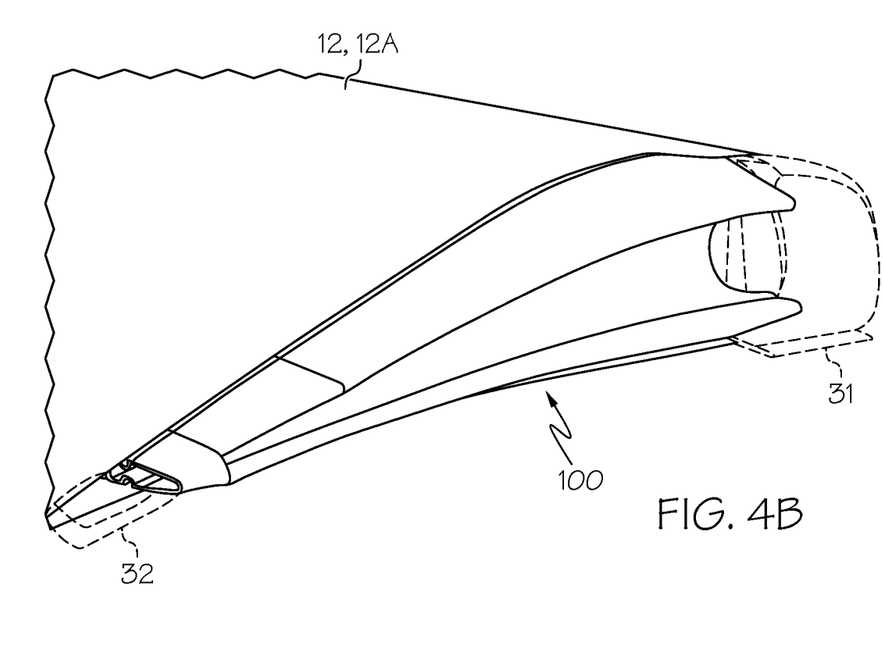
FIG. 4B is a perspective view, looking approximately along line 4B-4B of FIG. 3C.

Referring to FIG. 4B, a perspective view, looking approximately along line 4B-4B, of FIG. 3C, is illustrated. More specifically, FIG. 4B shows the aeroseal 100 attached to the outboard flap 12A and in the relaxed position of FIG. 3C. The aeroseal 100 is press-fit between inner surfaces 21, 22 of the outboard flap 12A. Optionally, a leading seal 31 (shown in dashed lines in FIG. 4B) may be positioned fore of the aeroseal 100. As an example, the leading seal 31 may comprise a known D-seal. Similarly, a trailing seal 32 (also shown in dashed lines in FIG. 4B) may be positioned aft of the aeroseal 100.

Referring again to FIG. 3B, the operation of the aeroseal 100 when there is relative movement between the inboard flap 11A and the outboard flap 12A will be described. During operation, the aeroseal 100 stays compressed and bent into the mating cove 250. This compression enables the aeroseal 100 to maintain its dynamic sealing function independent of the direction of relative motion between the inboard flap 11A and the outboard flap 12A. The direction of relative motion between the inboard flap 11A and the outboard flap 12A may comprise any combination of relative lateral motion (indicated by direction arrows "X"), relative up/down motion (indicated by direction arrows "Y"), relative longitudinal motion (indicated by a point "Z" which extends into and out of the page), and relative angular motion (indicated by direction arrows "R" around the point Z).

When there is relative lateral motion (i.e., along direction arrows X), the first and second engagement extensions 110, 114 compress or extend as needed to maintain the seal. While this is occurring, the first and second interior beads 221, 222 and the first and second exterior beads 231, 232 change shape as needed to accommodate the compression or extension of the first and second engagement extensions 110, 114. At the same time, the first and second slots 241, 242 provide additional space for the aeroseal 100 to change shape as needed.

When there is relative up/down motion (i.e., along direction arrows Y), one of the first and second engagement extensions 110, 114 compresses and the other one extends as needed to maintain the seal. While this is occurring, the first and second interior beads 221, 222 and the first and second exterior beads 231, 232 change shape as needed to accommodate the compression or extension of the first and second engagement extensions 110, 114. At the same time, the first and second slots 241, 242 provide additional space for the aeroseal 100 to change shape as needed.

When there is relative longitudinal motion (i.e., along the point Z into and out of the page), the first and second engagement extensions 110, 114 slide within the mating cove 250 as needed to maintain the seal. While this is occurring, the first and second interior beads 221, 222 and the first and second exterior beads 231, 232 change shape as needed to accommodate the sliding movement of the first and second engagement extensions 110, 114 within the mating cove 250. At the same time, the first and second slots 241, 242 provide additional space for the aeroseal 100 to change shape as needed.

When there is relative angular motion (i.e., around the point Z), one of the first and second engagement extensions 110, 114 compresses and the other one extends as needed to maintain the seal. While this is occurring, the first and second interior beads 221, 222 and the first and second exterior beads 231, 232 change shape as needed to accommodate the compression or extension of the first and second engagement extensions 110, 114. At the same time, the first and second slots 241, 242 provide additional space for the aeroseal 100 to change shape as needed.

It should be apparent that the first and second interior beads 221, 222 and the first and second exterior beads 231, 232 provide hinging relief for the aeroseal 100. The first and second exterior slots 241, 242 provide baffling for transverse compression and angular articulation. Moreover, the first and second engagement extensions 110, 114 always remains in engagement with the mating cove 250 to provide an effective aerodynamic seal throughout the full range of relative movement between the inboard flap 11A and the outboard flap 12A.

The following example illustrates a method of forming an aeroseal in accordance with an embodiment. The example forming method is intended to illustrate, but in no way limits, the scope of the disclosure.

Figure 5:
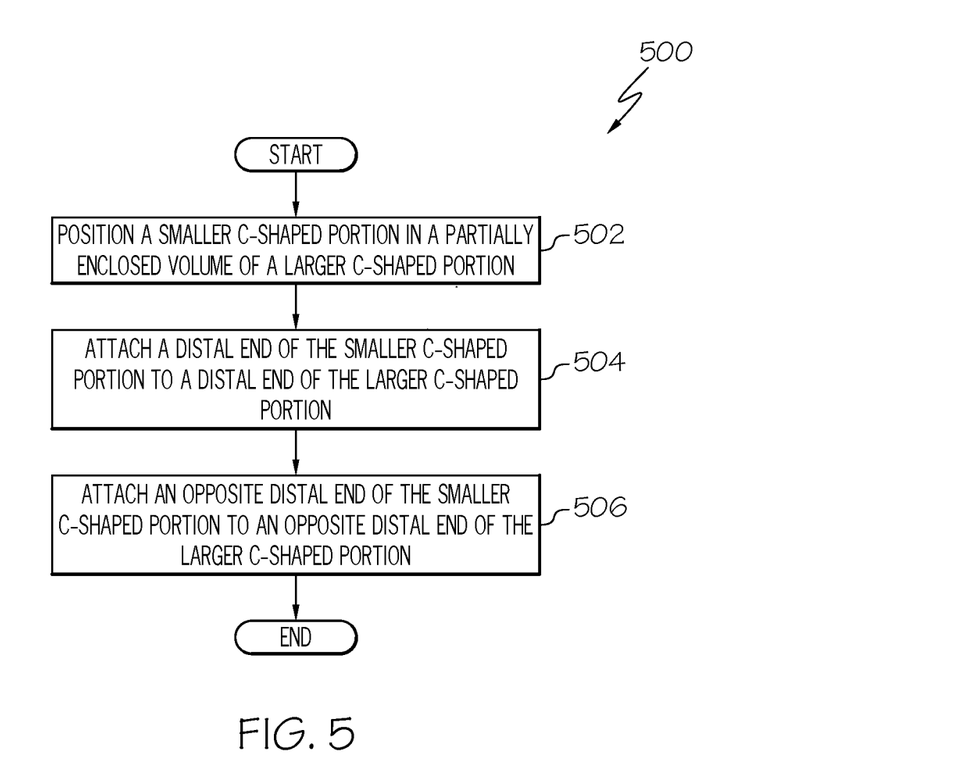
FIG. 5 is a flow diagram illustrating an example method for forming an aeroseal in accordance with an embodiment.

Referring to FIG. 5, a flow diagram is shown illustrating an example method 500 of forming example aeroseal 100 of FIG. 1 in accordance with an embodiment. The forming method may be carried out using any manufacturing system or apparatus suitable for making aeroseals. Numerous other manufacturing systems or apparatus for making aeroseals are available and, therefore, will not be described. The forming method 500 may be employed according to any combination of commercial, military, and space regulations, for example.

In block 502, a smaller C-shaped portion is positioned in a partially enclosed volume of a larger C-shaped portion. In block 504, a distal end of the smaller C-shaped portion is attached to a distal end of the larger C-shaped portion. In block 506, an opposite distal end of the smaller C-shaped portion is attached to an opposite distal end of the larger C-shaped portion. The process then ends.

The aeroseal 100 formed in accordance with the above-described example method provides an aerodynamic sealing function through the full range of motion between the inboard flap 11A and the outboard flap 12A. The result is reduced noise as well as reduced loss of lift of the aircraft wing.

Figure 6:
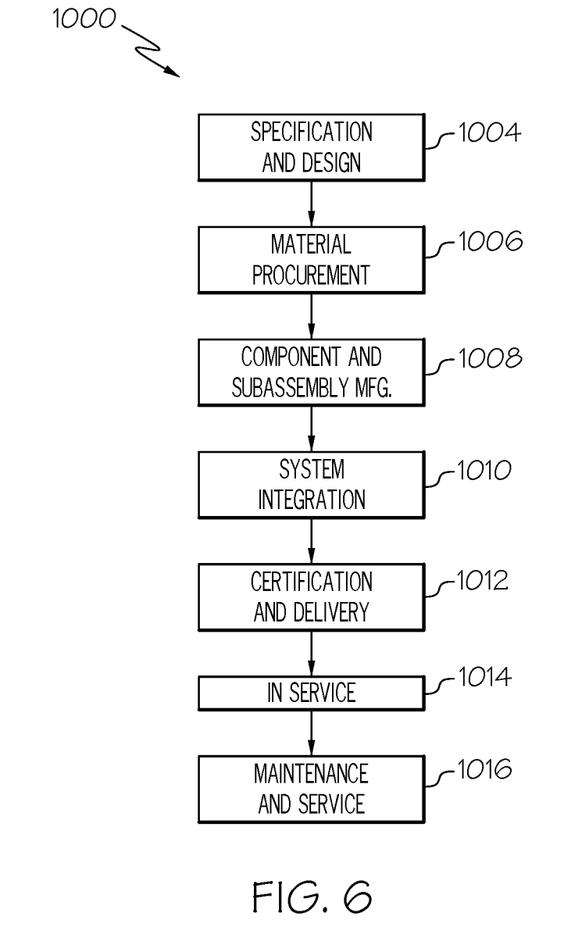
FIG. 6 is a flow diagram of an aircraft manufacturing and service methodology.
Figure 7:
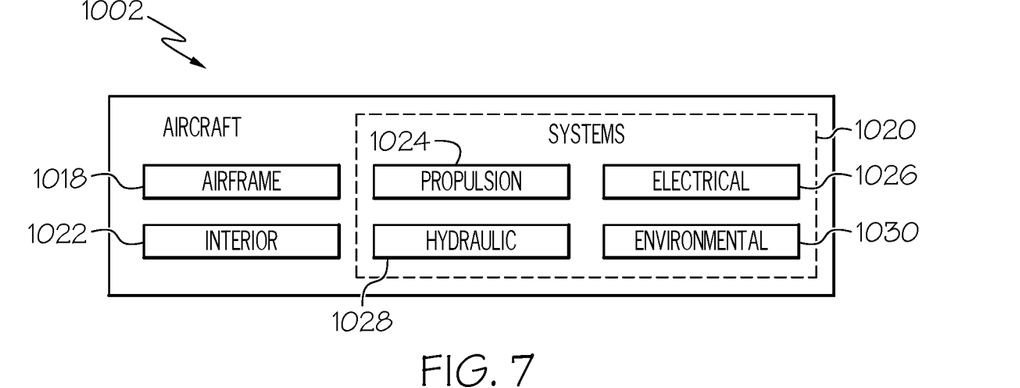
FIG. 7 is a block diagram of an aircraft.

Examples of the disclosure may be described in the context of an aircraft manufacturing and service method 1000, as shown in FIG. 6, and an aircraft 1002, as shown in FIG. 7. During pre-production, the aircraft manufacturing and service method 1000 may include specification and design 1004 of the aircraft 1002 and material procurement 1006. During production, component/subassembly manufacturing 1008 and system integration 1010 of the aircraft 1002 takes place. Thereafter, the aircraft 1002 may go through certification and delivery 1012 in order to be placed in service 1014. While in service by a customer, the aircraft 1002 is scheduled for routine maintenance and service 1016, which may also include modification, reconfiguration, refurbishment and the like.

Each of the processes of method 1000 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 7, the aircraft 1002 produced by example method 1000 may include an airframe 1018 with a plurality of systems 1020 and an interior 1022. Examples of the plurality of systems 1020 may include one or more of a propulsion system 1024, an electrical system 1026, a hydraulic system 1028, and an environmental system 1030. Any number of other systems may be included.

The disclosed aeroseal and forming method may be employed during any one or more of the stages of the aircraft manufacturing and service method 1000. As one example, components or subassemblies corresponding to component/subassembly manufacturing 1008, system integration 1010, and or maintenance and service 1016 may be fabricated or manufactured using the disclosed aeroseals and fabricating methods. As another example, the airframe 1018 may be constructed using the disclosed aeroseals and fabricating methods. Also, one or more apparatus examples, method examples, or a combination thereof may be utilized during component/subassembly manufacturing 1008 and/or system integration 1010, for example, by substantially expediting assembly of or reducing the cost of an aircraft 1002, such as the airframe 1018 and/or the interior 1022. Similarly, one or more of system examples, method examples, or a combination thereof may be utilized while the aircraft 1002 is in service, for example and without limitation, to maintenance and service 1016.

The disclosed aeroseal and forming method are described in the context of an aircraft; however, one of ordinary skill in the art will readily recognize that the disclosed aeroseal and forming method may be utilized for a variety of applications. For example, the disclosed aeroseal and forming method may be implemented in various types of vehicle including, for example, helicopters, passenger ships, automobiles, marine products (boat, motors, etc.) and the like.

Further, although various embodiments of the disclosed aeroseal and forming method have been shown and described, modifications may occur to those skilled in the art upon reading the specification. The present application includes such modifications and is limited only by the scope of the claims.

What is claimed is:

1. An aeroseal comprising:
    a substantially straight portion having a first engagement end and a second engagement end opposite the first engagement end;
    a first engagement extension extending transversely from the first engagement end of the substantially straight portion and having a distal end;
    a second engagement extension extending transversely from the second engagement end of the substantially straight portion and having a distal end; and
    a substantially curved portion interconnecting the distal end of the first engagement extension and the distal end of the second engagement extension to form an acute angle between the first and second engagement extensions and facing away from the substantially straight portion, wherein the substantially curved portion comprises a generally C-shaped portion having at least one interior bead disposed inside of the acute angle formed between the first and second engagement extensions.

2. The aeroseal of claim 1 wherein the substantially straight portion comprises a generally I-beam shaped portion.

3. The aeroseal of claim 1 wherein the first engagement extension includes a first exterior bead facing a first direction, and the second engagement extension includes a second exterior bead facing a second direction which is opposite the first direction.

4. The aeroseal of claim 3 wherein the substantially curved portion includes a first interior bead facing the first exterior bead of the first engagement extension, and a second interior bead facing the second exterior bead of the second engagement extension.

5. The aeroseal of claim 3 wherein the substantially straight portion includes a first slot facing one of the first and second directions, and a second slot facing the other one of the first and second directions.

6. The aeroseal of claim 5 wherein the first slot has a radius between 0.20 inch (0.5 cm) and 0.40 inch (1.0 cm) and the second slot has a radius between 0.20 inch (0.5 cm) and 0.40 inch (1.0 cm).

7. The aeroseal of claim 1 wherein the acute angle between the first and second engagement extensions is between five degrees and 45 degrees.

8. The aeroseal of claim 1 wherein the substantially straight portion, the first engagement extension, the second engagement extension, and the substantially curved portion are formed as a monolithic body.

9. A seal assembly comprising:
    a first member;
    a second member spaced apart from the first member; and
    an aeroseal positioned between the first and second members, the aeroseal comprising:
        a first C-shaped portion including first and second distal ends, defining a first partially enclosed volume within the first C-shaped portion; and
        a second C-shaped portion including third and fourth distal ends, defining a second partially enclosed volume within the second C-shaped portion, wherein the second C-shaped portion is disposed in the first partially enclosed volume of the first C-shaped portion, wherein the second C-shaped portion includes at least one interior bead, protruding toward the second partially enclosed volume.

10. The seal assembly of claim 9 wherein the first distal end of the first C-shaped portion and the third distal end of the second C-shaped portion are attached to each other, and the second distal end of the first C-shaped portion and the fourth distal end of the second C-shaped portion are attached to each other.

11. The seal assembly of claim 10 wherein the first and second C-shaped portions comprise a monolithic body.

12. The seal assembly of claim 9 wherein the at least one interior bead includes a first interior bead positioned in a vicinity of the third distal end of the second C-shaped portion, and a second interior bead positioned in a vicinity of the fourth distal end of the second C-shaped portion.

13. The seal assembly of claim 9 wherein the first C-shaped portion includes at least one exterior bead, protruding away from the first partially enclosed volume.

14. The seal assembly of claim 13 wherein the at least one exterior bead includes a first exterior bead positioned in a vicinity of the first distal end of the first C-shaped portion, and a second exterior bead positioned in a vicinity of the second distal end of the first C-shaped portion.

15. The seal assembly of claim 14 wherein the first C-shaped portion includes at least one exterior slot, facing away from the first partially enclosed volume.

16. The seal assembly of claim 15 wherein the at least one exterior slot includes a first exterior slot positioned distal to the first exterior bead of the first C-shaped portion, and a second exterior slot positioned distal to the second exterior bead of the first C-shaped portion.

17. The seal assembly of claim 9 wherein one of the first and second members comprises an inboard flap of an aircraft, and the other one of the first and second members comprises an outboard flap of the aircraft.

18. A method for forming an aeroseal for an aircraft wing, the method comprising:
   positioning a smaller C-shaped portion in a partially enclosed volume of a larger C-shaped portion;
   attaching a distal end of the smaller C-shaped portion to a distal end of the larger C-shaped portion; and
   attaching an opposite distal end of the smaller C-shaped portion to an opposite distal end of the larger C-shaped portion, wherein the smaller C-shaped portion defines a partially enclosed volume and wherein the smaller C-shaped portion comprises at least one interior bead, protruding toward the partially enclosed volume.

19. The aeroseal of claim 1, wherein the substantially straight portion abuts a flap of an aircraft wing.

20. The aeroseal of claim 2, wherein the substantially I-beam shaped portion, the first engagement extension, the second engagement extension, and the C-shaped portion are formed as a monolithic body.

* * * * *